(12) United States Patent
Reed (10) Patent No.: US 9,765,701 B2
(45) Date of Patent: Sep. 19, 2017

(54) GAS TURBINE LOAD ENHANCEMENT

(71) Applicant: General Electric Company, Schenectady, NY (US)

(72) Inventor: Robert Joseph Reed, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 13/837,550

(22) Filed: Mar. 15, 2013

(65) Prior Publication Data

US 2014/0260177 A1     Sep. 18, 2014

(51) Int. Cl.
*F02C 9/22* (2006.01)
*F02C 9/28* (2006.01)

(52) U.S. Cl.
CPC .............. *F02C 9/22* (2013.01); *F02C 9/28* (2013.01); *F05D 2270/303* (2013.01)

(58) Field of Classification Search
CPC ......................................... F02C 9/22
USPC ......................................... 700/287
See application file for complete search history.

(56) References Cited

U.S. PATENT DOCUMENTS

| | | | |
|---|---|---|---|
| 6,226,974 B1 * | 5/2001 | Andrew ............... | F02C 9/28 60/772 |
| 7,593,803 B2 | 9/2009 | Healy et al. | |
| 2002/0083712 A1 * | 7/2002 | Tomlinson ............ | F01D 17/08 60/775 |
| 2005/0107941 A1 * | 5/2005 | Healy ................. | F02C 9/28 701/100 |
| 2011/0265487 A1 * | 11/2011 | Gauthier ............... | F02C 7/228 60/773 |

FOREIGN PATENT DOCUMENTS

EP    2071157 A1    6/2009

* cited by examiner

*Primary Examiner* — Charles Freay
*Assistant Examiner* — Kenneth J Hansen
(74) *Attorney, Agent, or Firm* — Fletcher Yoder P.C.

(57) ABSTRACT

An automated industrial system is provided that includes a sensor system configured to monitor multiple parameters. The automated industrial system also includes a controller. The controller is configured to determine if any of the multiple parameters has surpassed a respective constraint threshold of multiple constraint thresholds. If any of the parameters has surpassed a respective constraint threshold, the controller is configured to classify a parameter of the multiple parameters which has surpassed the respective constraint threshold by the highest degree as the most constrained parameter. The controller is also configured to calculate a minimum temperature load path based on the most constrained parameter, with the minimum temperature load path configured to transition the automated industrial system from a base load to a part load via a minimum temperature load path.

19 Claims, 4 Drawing Sheets

GAS TURBINE LOAD ENHANCEMENT

BACKGROUND OF THE INVENTION

The subject matter disclosed herein generally relates to automated industrial systems, and more specifically, to generating a load path for an automated industrial system.

Some automated industrial systems (e.g., turbine systems) include a compressor, a combustor, a turbine, and an exhaust system. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases flow against and around turbine blades of the turbine, thereby driving rotation of the turbine and any external load. The external load may include an electrical generator. Some embodiments of automated industrial systems include combined cycle systems. Combined cycle systems include exhaust systems that have a heat recovery steam generator (HRSG). An HRSG improves the efficiency of the automated industrial system by using excess heat energy that passes through the turbine in exhaust to generate additional power.

Automated industrial systems may be operated at base load (e.g., normal power output) or at part load (e.g., lower power output relative to the base load). The transition from base load to a part load is considered a load path. A method of lowering power output includes first reducing airflow through an inlet which causes the temperature in the exhaust to increase. As the exhaust temperature increases, the HRSG steam is attemperated (e.g., liquid is mixed in to reduce temperature) to limit the maximum temperature of the steam. However, attemperation causes the automated industrial system efficiency to decrease because excess heat energy is dissipated without using the energy. Additionally, some embodiments of the described load path results in the highest possible turbine operating temperatures and hence part life of various components of the automated industrial system is reduced.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an automated industrial system includes a sensor system configured to monitor multiple parameters. The automated industrial system also includes a controller. The controller is configured to determine if any of the multiple parameters has surpassed a respective constraint threshold of multiple constraint thresholds. If any of the parameters has surpassed a respective constraint threshold, the controller is configured to classify a parameter of the multiple parameters which has surpassed the respective constraint threshold by the highest degree as the most constrained parameter. The controller is also configured to calculate a minimum temperature load path based on the most constrained parameter, with the load path configured to transition the automated industrial system from a base load to a part load via a minimum temperature load path.

In a second embodiment, a device includes a memory configured to store data indicative of multiple measured parameters. The measured parameters include emissions, combustion factors, and exhaust factors. The device also includes a processor coupled to the memory. The processor is configured to determine a constraint parameter. The constraint parameter comprises a measured parameter of the multiple measured parameters that most greatly surpasses a respective constraint threshold of multiple constraint thresholds each related to one of the multiple measured parameters. The controller is also configured to calculate a minimum temperature load path based at least in part on the constraint parameter. Furthermore, the controller is configured to use the minimum temperature load path to operate an automated industrial system.

In a third embodiment, a non-transitory, computer-readable medium storing instructions configured to receive data indicative of emissions, combustion factors, and exhaust factors of the automated industrial system Moreover, the instructions are configured to determine whether the emissions, the exhaust factors, or the combustion factors are a most constrained factor. The most constrained factor is classified as the emissions, the exhaust factors, or the combustion factors that has surpassed a respective constraint threshold of multiple constraint thresholds by a greater amount. The instructions are also configured to utilize the most constrained factor to control the automated industrial system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for controlling a load path of an automated industrial system. By actively controlling fuel flow in addition to air flow into a combustor, a desired turbine operating temperature may be achieved while maintaining efficiency of the automated industrial system, resulting in reduced amount of attemperation and enhanced parts life. Additionally, the disclosed embodiments provide systems and methods for controlling the load path by generally reducing the fuel flow and/or air flow while also avoiding a predicted combustion operability risk area (e.g., flame blow out, acoustic, resonances, etc.) that could cause the automated industrial system to go offline. Specifically, the system uses a model and/or sensors to determine if certain thresholds are or may be surpassed during the loading/unloading process. For example, a controller for the automated industrial system may generally produce an exhaust temperature that is generally lower than an automated industrial system by reducing fuel flow until a target HRSG steam approach temperature is achieved. However, as the automated industrial system approaches a combustion operability risk area, the controller may cause an increase in exhaust temperature (e.g., by decrease airflow and/or fuel flow) until the combustion operability risk area is avoided. In other words, the controller may control operation of the automated industrial system according to prioritized and/or most constrained factors. The most constrained factor refers to a monitored or predicted factor that has surpassed a maximum value and/or an approach value by a greater degree than other factors.

Figure 1:
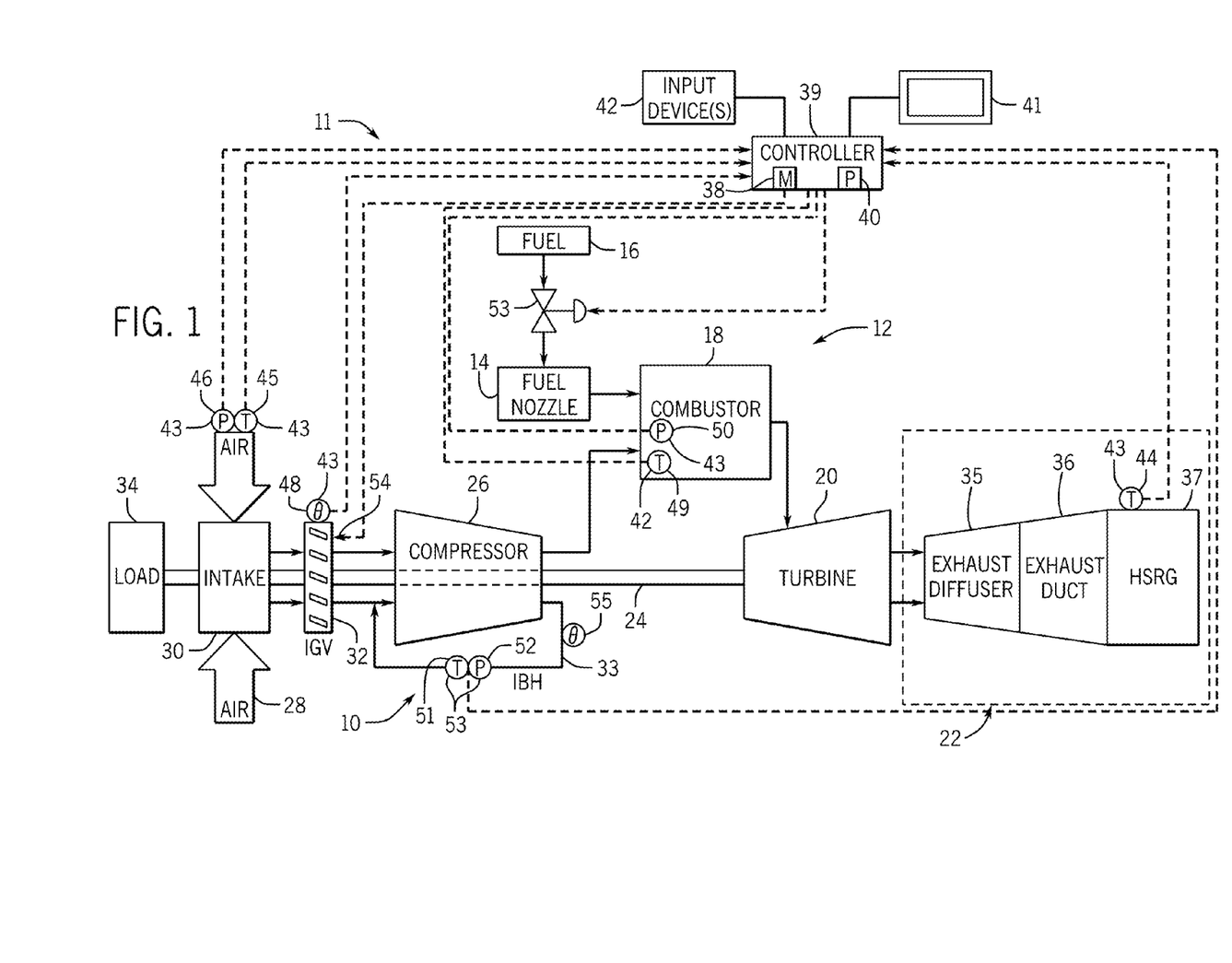
FIG. 1 illustrates a block diagram view of an embodiment of an automated industrial system.

Turning now to the drawings, FIG. 1 illustrates a block diagram of an embodiment of an automated industrial system 10 (e.g., turbomachinery) having a control system 11 and a turbine engine 12. The control system 11 may be configured to monitor and control aspects of the turbine engine 12 in response to monitored feedback. In some embodiments, the automated industrial system 10 may include a gas turbine, a steam turbine, and/or other similar turbine systems. The automated industrial system 10 may use liquid or gaseous fuel, such as natural gas and/or a synthetic gas (e.g., syngas), to drive the automated industrial system 10. As depicted, in some embodiments, one or more fuel nozzles 14 may intake fuel from a fuel supply 16. Each fuel nozzle 14 then mixes the fuel with an oxidant (e.g., air) and may distribute the fuel-air mixture into a combustor 18. In certain embodiments, the fuel from the fuel supply 16 may be mixed with air prior to entering the automated industrial system 10 (e.g., pre-mixed fuel). Multiple combustors 18 may be arranged circumferentially about the turbine engine 12. Further mixing occurs between the fuel and air within the combustors 18. Although shown schematically as being outside or separate from the combustors 18, the fuel nozzles 14 may be disposed inside the combustors 18. The fuel-air mixture combusts in a chamber within the combustors 18, thereby creating hot, pressurized combustion gases. The combustors 18 direct the combustion gases through a turbine 20 and toward an exhaust system 22. As the combustion gases pass through the turbine 20, the gases force blades within the turbine 20 to rotate a shaft 24 about a longitudinal axis of the turbine 20.

As illustrated, the shaft 24 is connected to various components of the automated industrial system 10, including a compressor 26. The compressor 26 also includes compressor blades coupled to the shaft 24. As the shaft 24 rotates, the compressor blades within the compressor 26 also rotate, thereby compressing air 28 from an air intake 30. The air intake 30 may feed the air 28 through a series of inlet guide vanes (IGVs) 32, which control the amount of air 28 that is conveyed into the compressor 26. In some embodiments, the air 28 may include a pre-mixed fuel, nitrogen, ambient air, other suitable fluids, or a combination thereof. The IGVs 32 may be disposed at an angle that can be increased or decreased to allow less or more air 28 into the compressor 26. Additionally, the automated industrial system 10 may include an adjustable Inlet Bleed Heat (IBH) channel 33 that may be used to redirect a portion of the compressed air from an outlet of the compressor 26 and/or exhaust 22 to the inlet of the compressor 26. In certain embodiments, this redirected air may be somewhat warmer than ambient air taken in at the compressor 26. Accordingly, the redirected air may heat the ambient air and cause the air to expand thereby reducing air flowed through the system and enabling the automated industrial system 10 to operate at a part load with or without the assistance of an IGV 32 angle change. Additionally, in some embodiments using pre-mixed fuel, the IBH channel 33 may be used to dilute a concentration of fuel in the air 28. The shaft 24 may also be coupled to a load 34, which may be a vehicle or a stationary load, such as an electrical generator in a power plant or a propeller on an aircraft, for example. The load 34 may include any suitable device capable of being powered by the rotational output of automated industrial system 10.

In certain embodiments of the automated industrial system 10, the exhaust system 22 includes an exhaust diffuser 35, an exhaust duct 36, and a heat recovery steam generator (HRSG) 37. The exhaust diffuser 35 dilutes exhaust gas received from the turbine and accelerates the diffusion process of the exhaust gas into the air. As illustrated, the exhaust diffuser 35 is coupled to the exhaust duct 36 that couples to the HRSG 37. In certain embodiments, the exhaust duct 36 may include an exhaust diffuser duct, such as an F-Class Conical Exhaust Diffuser Duct (MLI A042) made available by General Electric of Schenectady, N.Y. In some embodiments, the exhaust diffuser 35 may be integrated into the exhaust duct 36, such that the exhaust duct 36 may be used to increase diffusion of the exhaust gas. In other embodiments, the exhaust duct 36 may simply couple the turbine to the HRSG 37 to pass exhaust gas to the HRSG 37.

Once the exhaust gas passes into the HRSG 37, the HRSG 37 uses heat remaining in the exhaust gas to produce additional power, thereby increasing efficiency of the automated industrial system 10. In some embodiments, the HRSG 37 may include additional functions, such as emissions controls (e.g., selective catalytic reduction (SCR) systems). In certain embodiments, the HRSG 37 includes an economizer, evaporator, superheater, and/or preheater. The economizer heats liquids (e.g., water) using heat in the exhaust gas received from the exhaust duct 36. The evaporator turns the liquid to its gaseous form (e.g., steam). The superheater converts saturated steam into dry steam (i.e. steam with a temperature beyond the saturation point for the liquid). The superheater may include a radiant superheater, convection superheater, a separately fired superheater, or some combination thereof. Furthermore, in certain embodiments, the HRSG 37 may be a single pressure HRSG that contains a single steam drum that is generated at a single pressure level. In other embodiments, the HRSG 37 may a multi-pressure HRSG that consists of two or more sections. For example, the HRSG 37 may include a low pressure (LP) section, an intermediate pressure (IP) section, and/or a high pressure (HP) section. In such embodiments, each section may include a steam drum and evaporate section. Moreover, the HRSG 37 and/or the exhaust system 22 may include an attemperation system that controls the maximum temperature of the superheated steam. For example, the attemperation system may lower the temperature of the superheated steam by injecting liquid (e.g., water) into the steam.

The control system 11 may be used to control the operation of the turbine engine 12 to increase the operating efficiency or output power of the automated industrial system 10. In certain embodiments, the control system 11 includes a memory 38. The control system 11 may include a controller 39, which may be used to monitor and adjust various parameters of the turbine engine 12. In some embodiments, the memory 38 is included in the controller 39. In certain embodiments, the controller 39 may include an industrial controller 39, such as a double or triple redundant controller with 2, 3, or more processors 40. For example, the processors 40 may include general-purpose or application-specific microprocessors. Particularly, in some embodiments, a controller 39 may include any suitable computing device, such as a desktop computer or server. The controller 39 may also communicate with multiple sensors 43 to monitor aspects of the turbine engine 12. Likewise, the memory 38 may include volatile and/or non-volatile memory, random access memory (RAM), read only memory (ROM), flash memory, hard disk drives (HDD), removable disk drives and/or removable disks (e.g., CDs, DVDs, Blu-Ray disks, USB pen drives, etc.), or any combination thereof. Additionally, in certain embodiments, the automated industrial system 10 may include a display 41. In some embodiments, the display 41 may be integrated into (e.g., mobile device screen) or separate from (e.g., distinct monitor display) the controller 39. Additionally, the automated industrial system 10 may include one or more input devices 42 that receive selections of choices from one or more users. In certain embodiments, the input devices 42 may include mice, keyboards, touch screens, trackpads, or other input devices for receiving inputs to the controller 39.

Regardless of the specific components, instructions stored on the memory 38 may be designed to carry out various monitoring, analysis, display menu functions, and control functions of the disclosed embodiments. In the depicted embodiment, the controller 39 may interact with the sensors 43, which include an exhaust temperature sensor 44, an ambient air temperature sensor 45, an ambient air pressure sensor 46, an IGV angle sensor 48, a firing temperature sensor 49, a combustor pressure sensor 50, an IBH temperature sensor 51, an IBH air flow sensor 52, and/or additional sensors that measure various combustion emissions and dynamics. In place of one or more of the sensors 43, models may be used to estimate measurable quantities based on one or more sensor inputs. Further, the controller 39 may interact with an actuated valve 53 an IGV actuator 54, an IBH actuator 55, and/or other actuators to adjust operation of the turbine engine 12.

Additionally, the controller 39 may include one or more models for the automated industrial system 10. For example, in some embodiments, the controller 39 may include model predictive controller (MPC) models used to predict the outcome of changes to the automated industrial system 10 operation. In certain embodiments, the controller 39 may include a proportional-integral-derivative (PID) controller and/or other suitable physics-based controllers.

Figure 2:
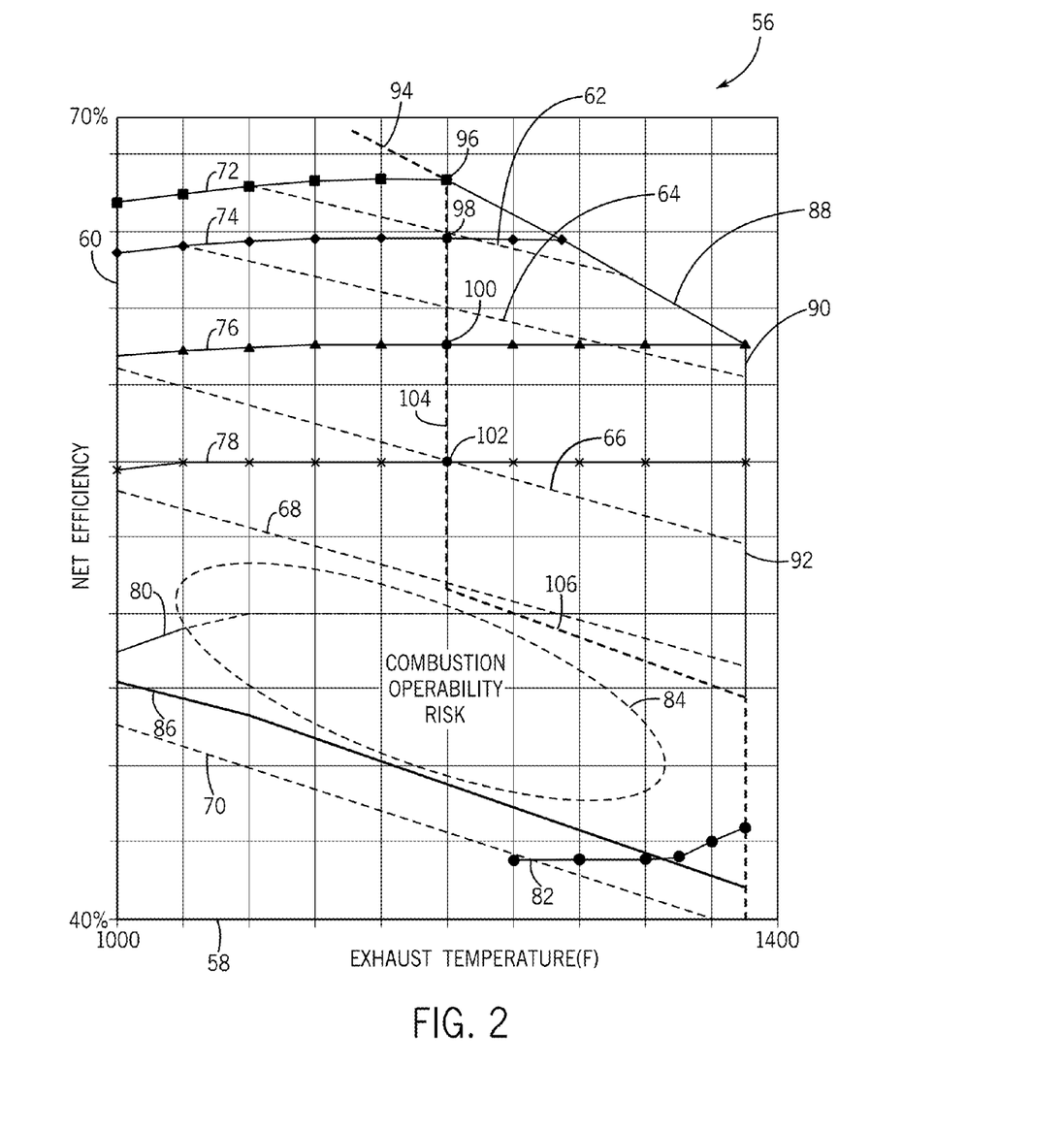
FIG. 2 illustrates a graphical view of an embodiment of load pathing of the automated industrial system of FIG. 1.

FIG. 2 is a graphical view of an embodiment of a graph 56 illustration possible load paths that may be used in the automated industrial system 10. The graph 56 includes an abscissa 58 and an ordinate 60. The abscissa 58 represents exhaust temperature of the automated industrial system 10. In some embodiments, the exhaust temperature may be measured at the HRSG 37 using the temperature sensor 44. In other embodiments, the exhaust temperature may be measured at some other portion of the exhaust system 22 (e.g., an external port, exhaust duct 36, etc.). Although the abscissa 58 illustrates values between 1000° F. and 1400° F., some embodiments of load paths may include other ranges or values. For example, other embodiments of a load path may occur in an 1100° F. and 1250° F. or some other suitable range of temperatures.

The ordinate 60 represents a net efficiency of the automated industrial system 10. The net efficiency refers to an efficiency of the automated industrial system 10 (e.g., combined cycle with a steam turbine engine). Although the illustrated embodiment of the ordinate 60 illustrates a range of 40% to 70% efficiency, other embodiments include alternative ranges, such as 50% to 60%, 55% to 65%, or some other suitable range of net efficiency.

The graph 56 also illustrates various levels of firing temperatures 62, 64, 66, 68, and 70 (referred to collectively as "firing temperatures 62-70"). Generally, a firing temperature may be measured by the temperature sensor 49 within the combustor 18. Each of firing temperatures 62-70 varies directly with a net efficiency value on the ordinate 60. For example, a higher firing temperature 62, within the illustrated values, generally provides more net efficiency than a lower firing temperature 70. Although only five firing temperatures 62-70 are displayed, the displayed firing temperatures are included for clarity, but it can be understood that a near-infinite number of firing temperatures are available depending upon precision of the measurement of the firing temperature. Furthermore, the graph 56 illustrates various load percentages 72, 74, 76, 78, 80, and 82 (referred to collectively as "load percentages 72-82") for the automated industrial system 10. The load percentages 72-82 generally vary directly with the net efficiency of the automated industrial system 10. In other words, each load percentage corresponds to the proportion of the operating load of the automated industrial system 10 is to the base load of the automated industrial system 10. For example, one load percentage 72 may correspond to the automated industrial system 10 operating at 90% of base load with each other load percentage (e.g., load percentage 74) may correspond to a lower percent of base load (e.g., 80%). These load levels can be achieved by any combination of fuel flow and airflow necessary to achieve the desired output at the desired efficiency level. This load path flexibility results in a near infinite number of turbine operating temperature possibilities that are optimized within the controller 39 to achieve a minimum turbine operating temperature at peak efficiency at a given load level.

The graph 56 also illustrates a combustion operability risk region (CORR) 84 that corresponds to values of firing temperatures, IGV angles, and fuel flow that may result in a risk that the automated industrial system 10 or some portion thereof may go offline. Various issues could cause the automated industrial system 10 to go offline in this region 84. For example, various portions (e.g., turbine 20) of the automated industrial system 10 can have increased acoustics and/or vibrations within the CORR 84 that could cause all/part of the automated industrial system 10 to go offline to prevent damage to the automated industrial system 10. Additionally, the CORR 84 may include an elevated risk of blow out of a flame in the combustor 18 that may cause the automated industrial system 10 to go offline in addition to other factors (e.g., acoustics, vibrations, etc.). The CORR 84 may be determined according to various characteristics of portions of the automated industrial system 10 or may be dynamically determined using measured values using the sensors 43 and/or controls integrated into the controller 39, such as model predictive control (MPC), proportional-integral-derivative (PID) control, physics-based controls, and/or or suitable control techniques. Accordingly, in some embodiments, the CORR 84 area may be hard coded, but other embodiments may determine the CORR 84 during operation using measured/predicted values for rotation, sound, pressure and/or temperature within various components of the automated industrial system 10 (e.g., combustor 18).

The graph 56 also illustrates a combustion operability boundary (COB) 86 that corresponds to a region below which the CORR 84 has been surpassed when choosing a load percentage (e.g., load percentage 82) below the COB 86. In some embodiments, the COB 86 may be a lower limit for ordinary operation of the automated industrial system 10. In other embodiments, the COB 86 may refer to a lower boundary for the CORR 84, such that the risks of combustion operability loss are reduced below the COB 86.

The graph 56 also illustrates a potential load path 88 that illustrates a path to reduce load of the automated industrial automation system 10 from base load to a part load at maximum turbine operating temperature. As illustrated, the firing temperature in the combustor 18 is reduced as the exhaust temperature increases. In certain embodiments, the IGV 32 angles are adjusted to reduce combustion operability risk and avoid the CORR 84. For example, in such embodiments, the exhaust temperature may be increased until an exhaust temperature limit 90 is reached. At this point, fuel flow through the actuated valve 53 and/or IGV 32 angles may be adjusted to further lower the load percentage and firing temperature along a vertical portion 92 of the load path 88. As the automated industrial system 10 operates in the vertical portion 92, excess heat in the exhaust system 22 is attemperated in the HRSG 37, thereby reducing the efficiency of the automated industrial system.

The graph 56 also illustrates an alternative enhanced cold load path (ECLP) 94. As illustrated, the ECLP 94 may pass through efficiency peaks 96, 98, 100, and 102 (referred to collectively as "efficiency peaks 96-102") instead of through the exhaust isotherm for load percentages 72-78. In the illustrated embodiment, each of efficiency peaks 96-102 corresponds to an exhaust temperature resulting in a maximum efficiency for each of the respective load percentages 72-78. In other embodiments, the efficiency peaks 96-102 may include any exhaust temperatures lower than the exhaust isotherm 90 and resulting in higher net efficiency for the automated industrial system 10. In other words, as the load percentage of the automated industrial system 10 decreases along a vertical portion 104 of the ECLP 94, the ECLP 94 results in a higher net efficiency than the load path 88 while generally maintaining a lower exhaust temperature. By lowering the exhaust temperature, part-life in the automated industrial system 10 may be increased along with net efficiency. Although the current embodiment shows a vertical portion of the ECLP, it can be understood that the ELCP can take any trajectory as determined by the controller 39 to minimize turbine operating temperature with peak efficiency.

As the ECLP 94 decreases load percentage along the vertical portion 104, the automated industrial system 10 operation approaches the CORR 84. To reduce risk of the automated industrial system 10 going offline, the controller 39 manages the output of the automated industrial system 10 and increases the exhaust temperature along the avoidance path 106 by adjusting IGV 32 angles and/or fuel flow through the actuated valve 53. The controller 39 causes the ECPL 94 to transition from the vertical portion 104 to the avoidance portion 106 upon determination that the ECPL 94 has approached/surpassed a threshold value that corresponds to the CORR 84. For example, in some embodiments, the controller 39 may transition the ECPL 94 from the vertical portion 104 to the avoidance portion 106 when hard coded values are surpassed/approached. In other embodiments, the controller 39 may transition the ECPL 94 from the vertical portion 104 to the avoidance portion 106 when measured values for rotation, sound, pressure, temperature, and/or other parameters are measured by the sensors 43 of the automated industrial system 10 (e.g., combustor 18). Additionally or alternatively, the controller 39 may transition the ECPL 94 from the vertical portion 104 to the avoidance portion 106 when the controller 39 (e.g., using MPC) predicts that values for rotation, sound, pressure, temperature, and/or other parameters will exceed threshold values.

In some embodiments, the avoidance portion 106 may increase the exhaust temperature via the IGV 32 vanes and/or actuated valve 53 until the exhaust isotherm 90 is reached such that a portion of the ECPL 94 correlates to the isotherm path 88. In other embodiments, once the controller 39 determines that the CORR 84 has been avoided, the controller 39 may again reduce the exhaust temperature (e.g., along load percentage 82). The controller 39 may determine that the CORR 84 has been avoided using any of the above-described methodologies of determining where the CORR 84 occurs in the graph 56 (e.g., MPC, sensors 43, etc.).

Figure 3:
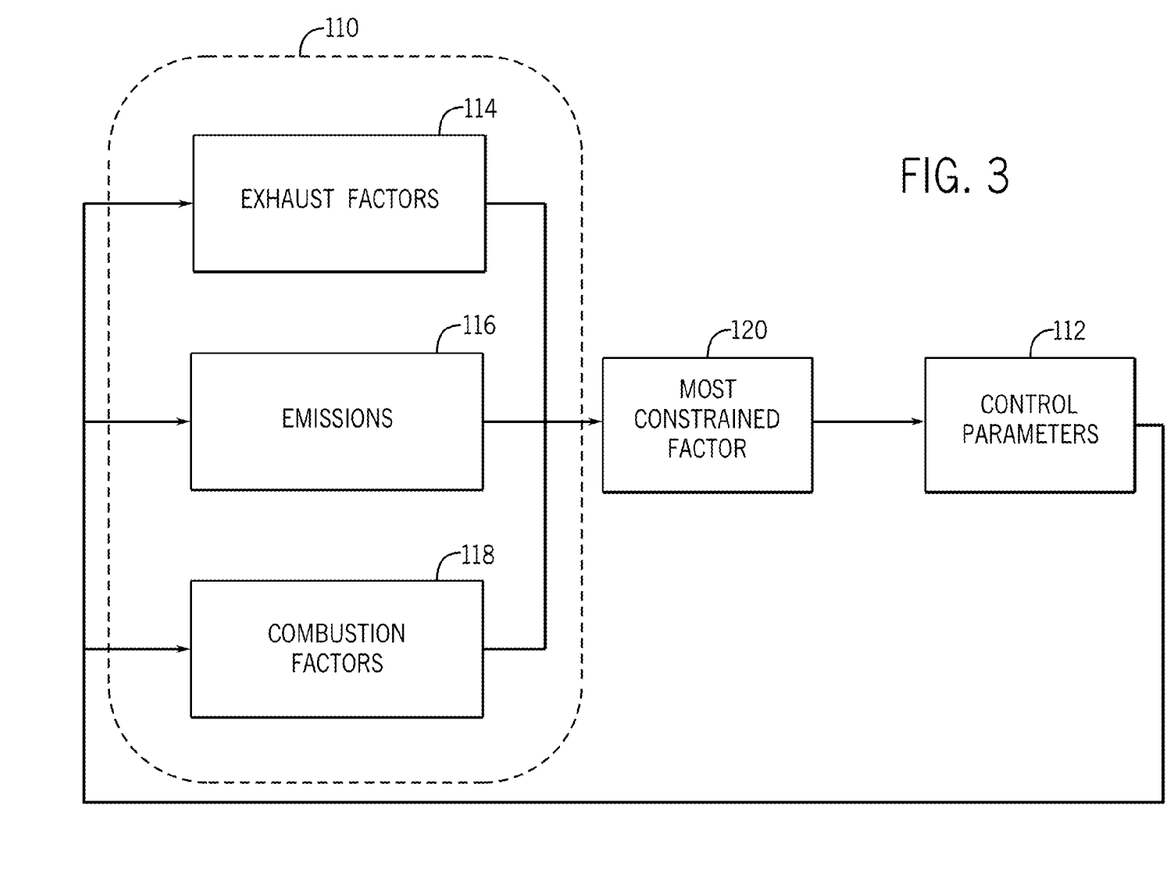
FIG. 3 illustrates a block diagram view of an embodiment of determining a minimum temperature load path for the automated industrial system of FIG. 1.

FIG. 3 illustrates a block diagram view of an embodiment of a method 108 of determining the EPCL 94 for the automated industrial system 10. The method 108 may be performed by the controller 39 or any other suitable computation devices (e.g., personal computer, workstation, processor, programmable logic controller, etc.). Additionally, the method 108 may be stored as instructions in the memory 38 and/or other suitable memory to be executed by the processor 40 and/or a processor of any suitable computation device. The method 108 includes an exhaust temperature request 110 that is used by the controller 39 to determine one or more control parameters 112 used to operate the automated industrial system 10. In certain embodiments, the control parameters 112 may include the IGV 32 angles, fuel flow through the actuated valve 53, and/or additional control parameters to control the output of the automated industrial system 10. To determine the control parameters 112, the controller 39 analyzes exhaust factors 114, emissions 116, and combustion factors 118.

Analyzing the exhaust factors 114 may include determining a difference between the exhaust temperature in the exhaust system 22 and a steam temperature (e.g., in the HP/IP/LP sections). If the difference between the steam temperature and the exhaust system 22 is too great, then the exhaust temperature is determined to be too high. In response, the controller 39 may cause the exhaust temperature to decrease unless restricted by one of the other factors as discussed below. Additionally or alternatively, if the steam temperature exceeds a lower threshold value, the exhaust temperature is determined to be too low and may be increased by the controller 39, as discussed below. In some embodiments, the steam temperature threshold value may be absolute (e.g., 300° F.) or may be proportional to some other temperature, such as an ambient temperature or exhaust temperature.

Analyzing the emissions 116 includes determining whether desired limits on emission levels of certain gasses (e.g., carbon monoxide, NOx, etc.) are measured as or predicted to be surpassed/approached. If the emissions levels surpass/approach desired thresholds, the controller 39 may adjust the actuated valve 53 to adjust fuel flow and/or adjust air flow through the IGV 32. Combustion factors 118 may include dynamic pressure, acoustic, rotation, vibration, and/or temperature measurements/predictions and related thresholds that are used to determine whether an elevated risk of combustion operability exists. In other words, combustion factors 118 include determining that the EPCL 94 is approaching/entering the CORR 84.

Since the exhaust factors 114, emissions 116, and the combustion factors 118 each have preset limits, the controller 39 determines which factor is the most constrained (i.e., closest to its limit or most highly surpassed an approach threshold) and uses the most constrained factor to determine the control parameters 112. In other words, if the exhaust factors 114 are approaching/surpassing a desired level while the emissions 116 and combustion factors 118 are determined to be within their limits, the fuel consumption and/or air flow is reduced/increased until the exhaust factors 114 are within desired ranges, as discussed above. If two or more factors approaching/surpassing their desired values, the controller 39 determines which factor is the most constrained 120 (i.e., will use the largest change to arrive in the desired range). The controller 39 then adjusts the control parameters 112 to achieve the desired values for the most constrained factor 120. Then, in some embodiments, the process begins again to determine the most constrained factor 120.

Figure 4:
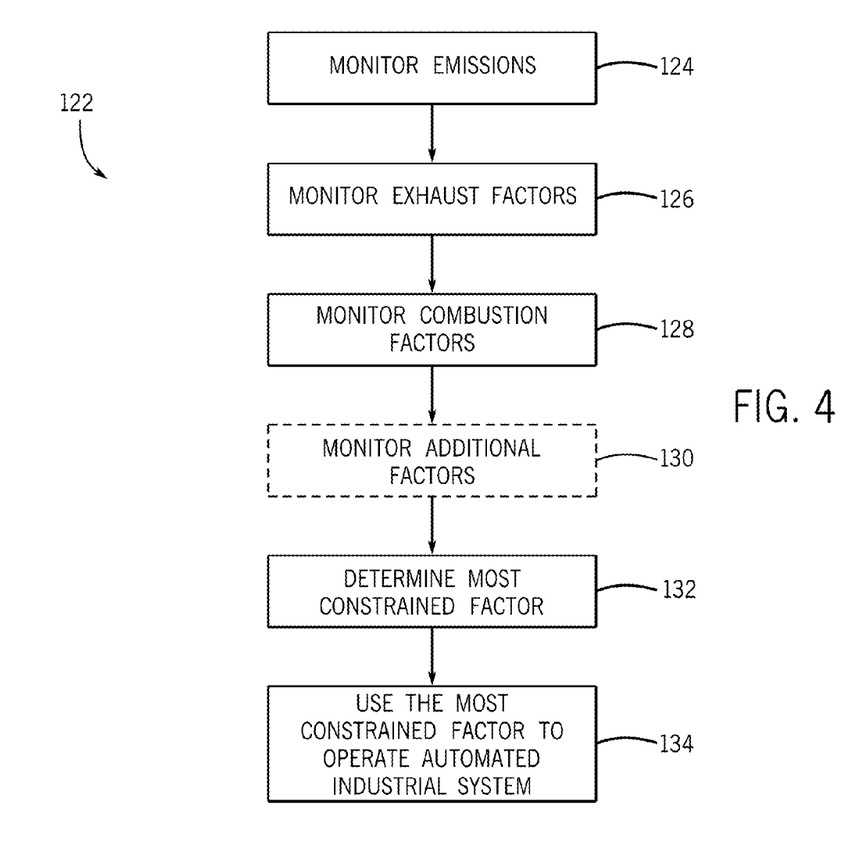
FIG. 4 illustrates a flow diagram view of an embodiment of a method for determining a minimum temperature load path for the automated industrial system of FIG. 1.

FIG. 4 is a flow chart illustrating a method 122 for controlling the industrial automation system 10. The method 122 includes monitoring emissions (block 124). For example, in some embodiments, a sensor 43 may be included before and/or after the HRSG 37 to determine emissions (e.g., NOx, CO, etc.). The method 122 also includes monitoring exhaust factors (block 126). In some embodiments, the exhaust factors may include temperature, pressure, particulates, or other various characteristics of the exhaust in the exhaust diffuser 35, exhaust duct 36, HRSG 37, and/or at some point downstream from the HRSG 37. In some embodiments, the exhaust factors include temperature and/or pressure of steam in the HRSG 37. For example, temperature and/or pressure may be measured using a sensor 43 in one or more boilers, superheaters, and/or other various portions of the HRSG 37. In certain embodiments, the exhaust factors may include a difference between an exhaust temperature and a steam temperature.

The method 122 also includes monitoring combustion factors (block 128). In certain embodiments, one or more sensors 43 may be used to measure pressure, acoustic, rotation, vibration, and/or temperature measurements and/or to predict that are used to determine whether the EPCL 94 is approaching/entering the CORR 84. In some embodiments, the method 122 includes additional factors using one or more sensors 43 (block 130). For example, in some embodiments, one or more sensors 43 may be used to determine ambient temperature around automated industrial system 10, air flow through the IGV 32, efficiency of the system, and/or other factors.

Using the monitored parameters, the controller 39 determines the most constrained factor (block 132). To determine the most constrained factor, the controller 39 determines which of the monitored factors has surpassed a maximum value and/or an approach value (e.g., a soft limit below the maximum value). In some embodiments, if more than one monitored parameter has surpassed the desired value, the controller 39 determines that most constrained factor is the parameter that has surpassed the desired value by the greatest amount. In other embodiments, the monitored parameters may be prioritized such that a higher priority parameter (e.g., combustion factors) automatically takes priority as the most constrained factor over a lower priority parameter (e.g., steam temperature) if both parameters have surpassed their respective desired values. The controller 39 uses the most constrained factor to control the automated industrial system (block 134). For example, the controller 39 drives the automated industrial system to maintain and/or lower the most constrained factor regardless of values of the other factors. In some embodiments, when no most constrained factor has been identified, the controller 39 may urge the automated industrial system 10 to operate at an efficiency peak for the current and/or planned firing temperature of the combustor 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. An automated industrial system, comprising:
a sensor system comprising a plurality of sensors configured to monitor a plurality of parameters; and
a controller comprising a processor configured to:
  determine if any of the plurality of parameters has surpassed a respective constraint threshold of a plurality of constraint thresholds, and if any of the plurality of parameters has surpassed the respective constraint threshold, classify a parameter of the plurality of parameters which has surpassed the respective constraint threshold by a highest degree as a most constrained parameter; and
  calculate a minimum temperature load path based on the most constrained parameter, wherein the minimum temperature load path is configured to transition the automated industrial system from a base load to a part load via the minimum temperature load path by:
    decreasing an exhaust temperature below a maximum exhaust temperature until approaching a combustion operability risk region within an area of operation of the automated industrial system bounded by an operability boundary; and
    upon approaching the combustion operability risk region, increasing the exhaust temperature while reducing a load percentage of the automated industrial system to avoid the combustion operability risk region that corresponds to an increased risk that the automated industrial system will go offline; and
  operating the automated industrial system using the calculated minimum temperature load path.

2. The automated industrial system of claim 1, wherein the plurality of parameters comprises emissions, combustion factors, and exhaust factors of the automated industrial system.

3. The automated industrial system of claim 2, comprising a heat recovery system generator (HRSG).

4. The automated industrial system of claim 3, wherein the plurality of sensors comprises a temperature sensor to monitor a steam temperature in the HRSG as steam factors.

5. The automated industrial system of claim 1, wherein the controller is configured to generate a signal for controlling a fuel flow through a fuel nozzle.

6. The automated industrial system of claim 1, wherein the controller is configured to generate a signal for adjusting angles of inlet guide vanes to control air flow through the automated industrial system.

7. The automated industrial system of claim 1, wherein the controller comprises a model predictive controller or a proportional-integral-derivative controller.

8. The automated industrial system of claim 1, wherein the automated industrial system comprises a turbine.

9. The automated industrial system of claim 1, comprising classifying a prioritized parameter as the most constrained factor if two or more of the plurality of parameters surpass respective constraint thresholds by an equal degree.

10. A device, comprising:
a memory configured to store data indicative of a plurality of measured parameters, wherein the plurality of measured parameters comprises emissions, combustion factors, and exhaust factors; and
a processor coupled to the memory, wherein the processor is configured to:
determine a constraint parameter, wherein the constraint parameter comprises a measured parameter of the plurality of measured parameters that most greatly surpasses a respective constraint threshold of a plurality of constraint thresholds each related to one of the plurality of measured parameters,
calculate a minimum temperature load path based at least in part on the constraint parameter; and
use the minimum temperature load path to operate the automated industrial system by decreasing an efficiency of automated industrial system to avoid a combustion operability risk region that corresponds to an increased risk that the automated industrial system will go offline, wherein the minimum temperature load path is configured to:
decrease an exhaust temperature below a maximum exhaust temperature of an automated industrial system until approaching the combustion operability risk region within an area of operation of the automated industrial system bounded by an operability boundary; and
upon approaching the combustion operability risk region, increase the exhaust temperature while reducing a load percentage of the automated industrial system to avoid the combustion operability risk region that corresponds to an increased risk that the automated industrial system will go offline.

11. The device of claim 10, wherein the exhaust factors comprise a steam temperature in a heat recovery steam generator.

12. The device of claim 10, wherein each of the plurality of constraints thresholds corresponds to an approach value within an operating range of the automated industrial system short of a parameter limit of each of the measured parameters.

13. The device of claim 10, wherein the controller is configured to calculate the minimum temperature load path through a high efficiency peak for each firing temperature of the automated industrial system unless a constraint parameter is present.

14. The device of claim 10, wherein the processor is configured to operate the automated industrial system by adjusting a flow of fuel through a fuel nozzle, wherein the fuel comprises synthetic gas or natural gas.

15. A non-transitory, computer-readable medium storing instructions configured to:
receive data indicative of emissions of an automated industrial system;
receive data indicative of exhaust factors of the automated industrial system;
receive data indicative of combustion factors of the automated industrial system;
decreasing an exhaust temperature of the exhaust factors below a maximum exhaust temperature until approaching a combustion operability risk region within an area of operation of the automated industrial system bounded by an operability boundary;
determine whether the emissions, the exhaust factors, or the combustion factors is a most constrained factor, wherein the most constrained factor is classified as the emissions, the exhaust factors, or the combustion factors that has surpassed a respective constraint threshold of a plurality of constraint thresholds by a greater amount; and
utilize the most constrained factor to control the automated industrial system to increase an exhaust temperature of the automated industrial system while reducing a load percentage of the automated industrial system to avoid the combustion operability risk region that corresponds to an increased risk that the automated industrial system will go offline.

16. The non-transitory, computer-readable medium of claim 15, wherein utilizing the most constrained factor to control the automated industrial system comprises adjusting an inlet guide vane angle of an air inlet of the automated industrial system.

17. The non-transitory, computer-readable medium of claim 15, wherein utilizing the most constrained factor to control the automated industrial system comprises adjusting a flow of fuel through a fuel nozzle.

18. The non-transitory, computer-readable medium of claim 15, wherein utilizing the most constrained factor to control the automated industrial system comprises transitioning from a base load to a part load using a cold load path.

19. The non-transitory, computer-readable medium of claim 18, comprising instructions configured to use monitored combustion factors to block operation of the automated industrial system in a combustion operability risk region in the cold load path.

* * * * *